D. H. WILDER.
MANUFACTURE OF TUBS AND BUCKETS.
No. 185,054.  Patented Dec. 5, 1876.
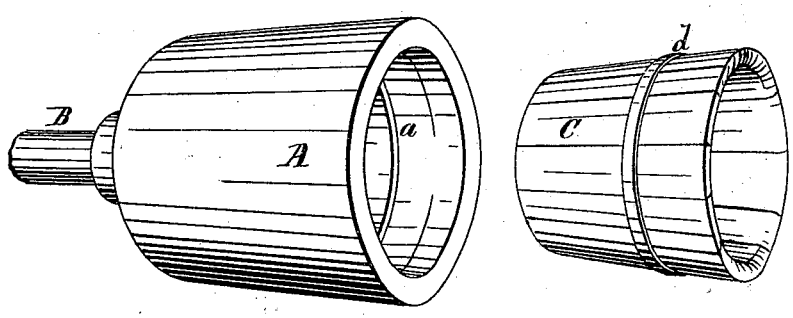
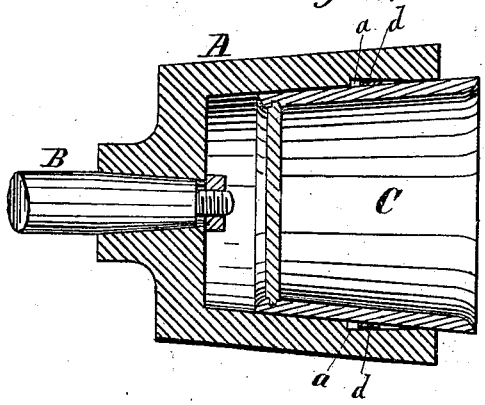
Witnesses:
John G. Center
J. A. Maloway
Inventor:
D. H. Wilder
By A. M. Smith, Attorney

UNITED STATES PATENT OFFICE.

DAVID H. WILDER, OF CORRY, PENNSYLVANIA.

IMPROVEMENT IN THE MANUFACTURE OF TUBS AND BUCKETS.

Specification forming part of Letters Patent No. 185,054, dated December 5, 1876; application filed September 13, 1876.

*To all whom it may concern:*

Be it known that I, DAVID H. WILDER, of Corry, county of Erie, State of Pennsylvania, have invented a new and useful Improvement in the Manufacture of Tubs and Buckets, &c., of which the following is a full, clear, and exact description, reference being had to the accompanying drawing, making part of this specification, in which—

Figure 1 is a perspective view of my improved chuck for holding the bucket or tub, and adapting it to be turned on its interior, showing also a bucket detached or slightly removed therefrom; and Fig. 2 is a longitudinal section through the same, with the bucket properly placed in the chuck.

Similar letters of reference denote corresponding parts in both figures.

In the manufacture of buckets and tubs, and of other vessels of wood having a similar form, viz., that of the frustum of a cone, as ordinarily practiced, difficulty has been experienced in turning the interior of such vessel, in consequence of the necessity of placing the band which secured the staves together in close proximity to the larger end of the vessel, and outside of the chuck which held the vessel, and through which the required rotary motion was imparted to it, this construction leaving the inner ends of the staves unsupported, (except where they conform to the exact taper of the chuck and were incidentally supported thereby,) and rendering them liable to spring away from the tool in the process of being turned, and to leave the interior of the bucket not only inaccurately and roughly finished, but causing the croze, which is turned or cut while the vessel yet remains in the chuck, to be also unevenly formed and imperfectly adapted to receive the head, bottom, or end.

The object of my invention is to remedy this difficulty, and to facilitate the labor, and thereby diminish the cost of manufacture; and to this end my invention consists in providing the tapering interior of the chuck with a groove or grooves adapting it to receive a tub or bucket, having a hoop or band placed upon it at or near midway of its length, whereby the staves forming said tub or bucket are more firmly held against springing at their inner ends, while at the same time retaining the usual hold or grasp of the chuck itself, as hereinafter explained.

In the accompanying drawings, A represents a chuck, and B the driving-shaft with which the chuck is connected, said parts, except in the particulars hereinafter specified, being constructed and united in any usual or preferred manner. The chuck A is made with the usual taper on its interior face, adapting it to receive and hold a tapering tub or bucket, C, during the process of turning the interior of such vessel, and of cutting the croze therein, but instead of the taper being made continuous, as is usually done, an annular groove or grooves are cut in the inner face, as shown at *a*, said grooves being formed by divergence inward from the line of taper of the inner face of the chuck, and terminating in an abrupt shoulder, as shown.

By this construction the hoop *d*, placed midway of the length of the vessel, is adapted to readily enter the open mouth of the chuck and groove, and to rest within the groove, as shown in Fig. 2, thus forming, independently of the chuck, a support for the staves at any desired point intermediate between the open end of the chuck and the inner end of the tub or bucket, while such tub or bucket, by being thrust into the chuck in the usual manner, is caught and supported at or near its outer larger end by the open end of the chuck itself, thereby causing the vessel to be firmly supported in the process of turning.

If desired, the usual hoop at the outer or larger end, can, of course, be applied in the usual manner prior to turning the interior and forming the croze, but it will be evident that from the increased leverage given to the hoop when centrally applied, as explained, the application of the outer hoop, before turning, is unnecessary. The bottom hoop or hoops also, if desired, can be put upon the vessel prior to turning out its interior, by employing an additional groove or grooves in the chuck in proper relation to the tub or vessel, but as the crozing is done while the tub remains in the chuck, adapting it to receive the bottom or end after its removal therefrom, ordinarily the lower hoops will not be applied until after the tub or bucket has been removed, and the head or end applied in the usual manner.

Aside from the particular manner of applying the hoop for supporting the staves of the tub or bucket in the process of turning and crozing, such vessel may be constructed, and the turning and crozing may be accomplished, in the usual or any preferred manner.

Having now described my invention, what I claim as new, and desire to secure by Letters Patent, is—

In the manufacture of tubs and buckets, the rotating chuck herein described, for holding the same while being turned upon their inner side, provided with a groove or grooves adapting it to receive the tub or bucket with the hoop or hoops applied to it, substantially in the manner and for the purpose set forth.

In testimony whereof I have hereunto set my hand this 8th day of September, A. D. 1876.

DAVID HOWARD WILDER.

Witnesses:
R. H. PALMER,
WILL. PORTER.